United States Patent
Coello et al.

(10) Patent No.: US 7,615,755 B2
(45) Date of Patent: Nov. 10, 2009

(54) PHOTON COUNTING DETECTOR WITH COMPARATOR AND SWITCHOVER RATE ANALYZER

(75) Inventors: Sébastien Christopher Coello, Grenoble (FR); Marc Arques, Grenoble (FR); Jean-Marc Dinten, Lyons (FR)

(73) Assignee: Commissariat a l'Energie Atomique (FR)

( * ) Notice: Subject to any disclaimer, the term of this patent is extended or adjusted under 35 U.S.C. 154(b) by 0 days.

(21) Appl. No.: 12/029,579

(22) Filed: Feb. 12, 2008

(65) Prior Publication Data

US 2008/0191139 A1     Aug. 14, 2008

(30) Foreign Application Priority Data

Feb. 13, 2007   (FR) ................................. 07 01032

(51) Int. Cl.
*H01L 27/144* (2006.01)
*G01T 1/36* (2006.01)
*G01T 1/29* (2006.01)

(52) U.S. Cl. ............................. 250/370.09; 250/370.01; 250/370.06; 378/19

(58) Field of Classification Search ........................ None
See application file for complete search history.

(56) References Cited

U.S. PATENT DOCUMENTS 5,461,425 A   10/1995   Fowler et al.

| | | | |
|---|---|---|---|
| 7,332,724 B2* | 2/2008 | Hefetz et al. | 250/370.06 |
| 2006/0027730 A1* | 2/2006 | Bamji et al. | 250/208.1 |

FOREIGN PATENT DOCUMENTS

| EP | 1 227 663 | 1/2002 |
|---|---|---|
| EP | 1 657 910 | 7/2002 |
| WO | WO 2007003577 | 1/2007 |

* cited by examiner

*Primary Examiner*—David P Porta
*Assistant Examiner*—Yara B Green
(74) *Attorney, Agent, or Firm*—Lowe Hauptman Ham & Berner, LLP

(57) ABSTRACT

The invention relates to detectors for radiological imaging, and more particularly the X-ray matrix detectors, produced in the form of a CMOS technology pixel matrix, associated with a structure for converting X-rays into electrons. Each pixel comprises a reading circuit comprising on the one hand a comparator (COMP1) switching over each time a charge increment arrives resulting from the integration of a charge current generated by the lighting and on the other hand a counting circuit (CPT1, CPT2) for counting the number of switchovers of the comparator. The circuit for reading each pixel comprises a circuit (CMC) for analyzing the rate of the switchovers of the comparator, this analysis circuit acting on the counting circuit to modify its operation according to the result of the rate analysis. For example, the analysis circuit switches the counting pulses to one counter (CPT1) or another counter (CPT2) depending on the result of the analysis. Applicable in particular to bi-energy radiology and X-photon impact spectrometry analysis.

20 Claims, 2 Drawing Sheets

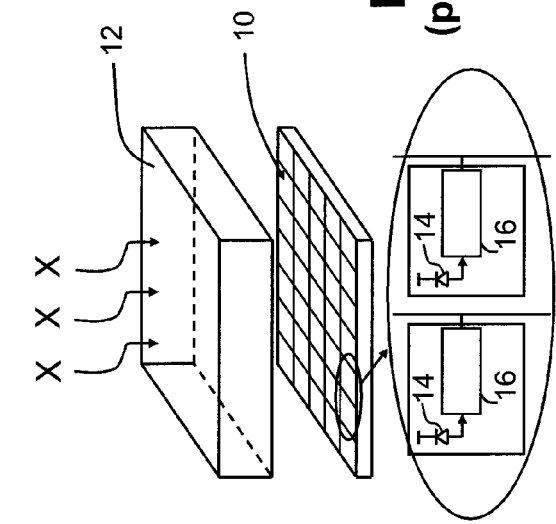

US 7,615,755 B2

PHOTON COUNTING DETECTOR WITH COMPARATOR AND SWITCHOVER RATE ANALYZER

RELATED APPLICATIONS

The present application is based on, and claims priority from, French Application Number 07 01032, filed Feb. 13, 2007, the disclosure of which is hereby incorporated by reference herein in its entirety.

FIELD OF THE INVENTION

The invention relates to X- or gamma-ray detectors, in particular those intended for X- or gamma-ray radiological imaging, and more particularly the X-ray matrix detectors, produced in the form of a CMOS technology pixel matrix, associated with a structure for converting X-rays into electrons. The conversion is direct, using materials such as HgCdTe which produce electrical charges under the effect of the X-rays, or indirect, using a scintillating layer which converts the X-rays into visible light and a matrix of photodetectors which detect the visible light and convert it into electrical charges.

BACKGROUND OF THE INVENTION

The main advantage of CMOS technology over old technologies of CCD or amorphous silicon thin film type is the possibility of placing at the level of each pixel an electronic circuit associated with a radiation detection element; the detection element supplies an electrical charge current according to the stream of X photons received by the pixel; the electronic circuit processes this charge current before supplying at the output of the matrix processed information rather than a quantity of raw charges. For simplicity, the term "photodetector" will be used hereinafter to denote this photon stream detection element, regardless of whether a direct or indirect conversion structure is used, because the main interest is in the circuit for reading the electrical charges obtained from the conversion structure and not the conversion structure itself.

Thus, with a CMOS technology, instead of collecting and transferring to an output register a quantity of electrical charges generated in each pixel, these charges can first of all be converted into an analog current or voltage level and the current or voltage transported outside of the matrix by successively addressing each row of the matrix. Even better, the charges can be converted into digital signals within the pixel itself, to more easily transport the result of the detection towards the outside of the matrix, still by successively addressing the various rows of the matrix.

FIG. 1 represents a schematic diagram of a matrix detector for radiology, in the case (taken by way of example) of an indirect conversion structure: the matrix detector comprises a matrix 10 of photosensitive pixels, a scintillating layer 12 converting the X- or gamma-rays into light rays in the spectrum to which the photodetectors 14 of the matrix are sensitive, and a processing circuit 16 associated with each pixel. The processing circuit is essentially a circuit for reading and converting charges and, for simplicity, it will hereinafter be denoted charge reading circuit 16.

In the case of radiology, two main types of charge reading circuit can be incorporated at the level of each pixel:

an integration circuit which integrates in an integration capacitor the sum of the charges produced by the lighting of the pixel during a period of exposure to the X- or gamma-rays; the output of the pixel is an analog voltage proportional to the X or gamma energy received during this period; however, it is also possible to provide digital data representing this energy, as will be seen below;

or a photon counting circuit which entails converting the burst of electrical charges resulting from each photon into a voltage pulse; for this, the amplitude of this pulse is compared to a reference voltage which represents an energy threshold below which it is considered that there has been no photon impact; the energy pulses above this threshold provoke the delivery of a pulse which increments a digital counter at the output of the pixel; this counter contains, at the end of the exposure period, the number of photons received during this period and having an energy greater than the threshold.

The advantage of the photon counting method is that it directly provides digital information at the output of the pixel and this information is directly linked to the photons received, not to the noise. However, the drawback is that the measurement becomes very difficult when the photon stream becomes high: the counting electronics can no longer distinguish the photons from each other if they are almost simultaneous: two simultaneous photons give rise to a single counting pulse.

To obtain advantages similar to those of photon counting without the drawbacks, WO 2007003577 has already proposed the use of a circuit operating by integration of electrical charges generated by the photodetector of the pixel but directly converting inside the pixel the quantity of charges into a digital value. This circuit consists of an integration stage, with an integration capacitor, which receives the charge current obtained from the photodetection, a threshold comparator and a counter; the threshold comparator detects that an elementary quantity of charges $-Q0$ has been received from the photodetector, it switches over and increments the counter by one unit (the minus sign is used arbitrarily, it corresponds to the fact that in practice the integration capacitor, precharged, sees its charge decrease all the more as the pixel receives a greater stream of X photons); concurrently with this switchover, the comparator triggers the injection of an opposite charge $+Q0$ into the capacitor; this returns to its initial charge while continuing to receive the charges from the photodetector; the counter therefore counts the bursts of charges $-Q0$ successively received by the pixel during the exposure period; this digital content then represents the quantity of photonic energy received during this period; it is this digital quantity which is supplied as output from the pixel.

FIG. 2 represents a schematic diagram of such a reading circuit. The integration capacitor is denoted $C_{int}$, the threshold comparator COMP1, the counter CPT1, and the $+Q0$ charge reinjection circuit CFB. The charge current generated by the photodetector is denoted $I_{det}$, and the voltage generated at the terminals of the integration capacitor $C_{int}$ is $V_{int}$. This voltage is in sawtooth form if the current generated by the photodetector is constant since the voltage of the terminals of the capacitor periodically returns to its initial value.

When the radiological detector is not illuminated by X- or gamma-rays, the photodetector does, however, supply charges which correspond to its non-zero dark current. The dark current is a leakage current which is inevitable in the standard photodetectors, whether photodiodes or phototransistors for example.

The counter is therefore incremented regularly, even if slowly, in the absence of X or gamma illumination. The capacitor $C_{int}$ is discharged by $Q0$ then recharged by $Q0$ periodically.

When the X illumination is triggered, the counting rate speeds up (except, obviously, for pixels which would be completely masked by a substance opaque to the incident rays). The counting speeds up all the more as the pixel is more strongly illuminated. It even speeds up considerably in undesirable situations in which a photon accidentally passes through the conversion structure 12 without being absorbed, and is directly absorbed into the CMOS reading circuit; such a photon can hit the reading circuit in a sensitive spot like the charge integration node; it then generates a large burst of electrical charges which will be dispelled only by a multiplicity of Q0 charge reinjections returned by the feedback circuit CFB. Other circumstances can even generate changes of counting rate as will be seen below.

To improve the possibilities offered by the detectors (and in particular the detector matrices) in which each pixel comprises a reading circuit with, on the one hand, a comparator switching over each time a charge increment arrives resulting from the integration of a charge current generated by the lighting and on the other hand a counting circuit for counting the number of switchovers of the comparator, the present invention proposes to incorporate in the reading circuit of each pixel a circuit for analyzing the rate of the switchovers of the comparator, this analysis circuit acting on the counting circuit to modify its operation according to the result of the rate analysis. The rate is analyzed on the basis of the observation of the time intervals that exist between successive switchovers.

In a first variant, if the rate is less than a bottom lower threshold value, provision is made for the content of the counter not to be incremented. On the other hand, above this threshold, the content of the counter is incremented. This drop below the bottom threshold is, in effect, the sign that no X or gamma illumination is probably present and that only the leakage currents are acting. This variant is useful, for example, for synchronizing the counting with the start of the illumination.

In a second variant, provision is made for the reading circuit to comprise two counters which are used alternately depending on whether the measured rate is above or below a threshold; this makes it possible, for example, not to lose the information added to the dark current, while clearly separating it from the information resulting from the X or gamma illumination.

In a third embodiment, compatible with the previous two, the counting is interrupted if the counting rate accelerates abruptly, indicating, for example, the impact of an undesirable photon directly in the CMOS reading circuit; the counting is restored when the effect of this impact, which is in theory occasional and rare but which could disturb an image, disappears.

SUMMARY OF THE INVENTION

In a particularly interesting embodiment, the detector according to the invention is used to operate in a bi-energy image detection system with an X- or gamma-ray source alternately emitting different energy ranges. The circuit for analyzing the counting switchover rate detects the change of energy by the abrupt increase or reduction in the rate and it orders a first counter or a second counter to be incremented depending on the result of this detection. Thus, the digital information corresponding to high energy can be separated from the digital information corresponding to low energy.

In another interesting embodiment, the detector according to the invention is used for the spectrometry of isolated X or gamma photon impacts: a pixel receives a photon and the energy category to which this photon belongs (high or low energy or subdivision into more than two categories) has to be determined, to then count, during an exposure period, the number of photons received in each category; when a photon arrives on a pixel, the photodetector quickly produces a quantity of charges which are integrated; these charges are counted by the comparator reading circuit which counts the successive charge increments due to the photon; this produces a burst of rapid counting pulses. The rate analysis circuit detects the presence of this burst; it determines whether the number of switchovers in a given time is above or below a threshold; if it is below, the number of switchovers is not taken into account, assuming that it does not represent the impact of a photon; if it is above, the number of switchovers during a burst is taken into account to determine, depending on its value, the energy category into which the photon fell. The photons of each category are counted separately in separate counters.

One way of analyzing the rate consists in counting the ticks of a clock (brought to each pixel) between two switchovers of the comparator of the reading circuit. This gives a time measurement between two switchovers and therefore a rate measurement, which can be compared to a high threshold and/or to a low threshold. It is also possible to measure the time between two switchovers by measuring the voltage at the terminals of a capacitor integrating a constant current during the interval between two switchovers; this voltage is then compared to a high threshold and/or a low threshold. This measurement solution based on integration of a constant current avoids having to bring a clock conductor to each pixel.

Another way of analyzing the rate consists in observing a rate variation rather than an absolute rate, or a variation of time intervals rather than a time interval and in comparing this variation to a threshold. This amounts to analyzing the time interval between two comparator switchovers, and in seeing whether the time interval between a current switchover and a preceding switchover has varied little or much from one switchover to the next. Here again, it is possible to make this determination without needing to bring a clock signal to each pixel: the rate variations can be determined with a time base consisting of a reference current source and an integrator; a threshold comparator compares two successive voltages: an integrated voltage during the time interval between a preceding switchover and a current switchover, and an integrated voltage between a current switchover and a subsequent switchover; this comparator switches over if the difference between these voltages exceeds a predetermined threshold indicating a rate change that is significant enough to require an action. Provision can be made, according to the applications, for it to switch over only on a transition to a faster rate, or alternatively for it to switch over in one direction on a change to a faster rate and in the other direction on a change to a slower rate.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1, already described, represents the principle of a matrix radiological image detector;

FIG. 2 represents a diagram of a circuit for reading charges by charge increment integration and counting successive switchovers of a comparator;

FIG. 3 represents a diagram according to the invention with a circuit for analyzing switchover rate which enables or stops the counting;

FIG. 4 represents a diagram with a rate analysis circuit which switches the counting pulses to one or other of two counters according to the time interval between switchovers;

FIG. 5 represents a diagram with a circuit which switches the counting pulses to one or other of two counters according to the time interval variation between switchovers;

DETAILED DESCRIPTION OF THE DRAWINGS

Figure 6:
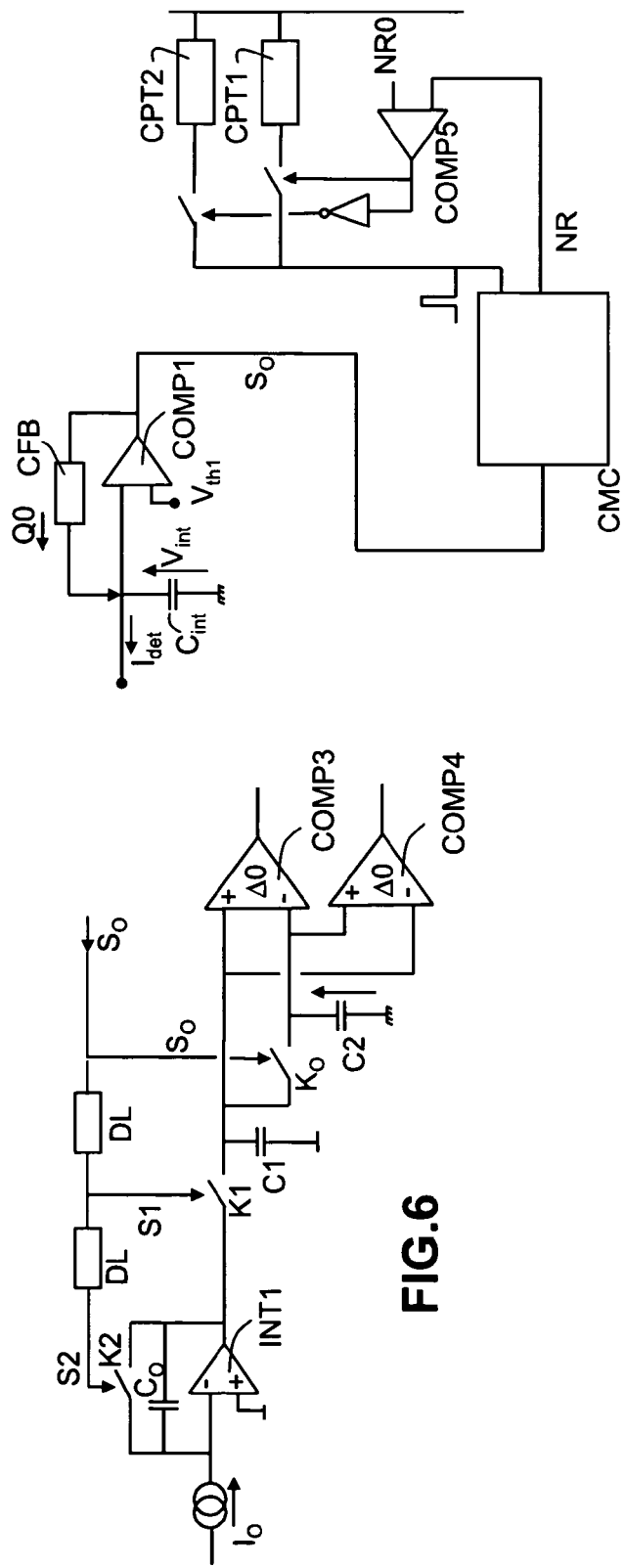
FIG. 6 represents an exemplary circuit for detecting the time interval variation.

As explained previously, FIG. 2 represents a theoretical circuit associated with each pixel of a matrix, making it possible to supply at the level of the pixel a digital value of received photon streams, based on the integration of a charge current $I_{det}$ generated by the photon stream, whether by direct or indirect conversion.

The charges arrive at an input node E and are stored in an integration capacitor $C_{int}$. The charges are in principle electrons; this is why the representation shows a photodetection current $I_{det}$ leaving the capacitor $C_{int}$ and going to the node E. The capacitor $C_{int}$ is precharged to a fixed voltage $V_{pr}$ at the start of each exposure period, by a precharging circuit which is not represented, and the current $I_{det}$ discharges the capacitor in direct proportion to the quantity and energy of the X photons received. Hereinafter, the description will refer to X photons although the invention applies equally to gamma photon detection.

The capacitor $C_{int}$ is linked to a threshold comparator COMP1, which switches over when the voltage at the terminals of the capacitor falls below a threshold $V_{th1}$.

This comparator switchover triggers the reinjection to the capacitor $C_{int}$ of a charge quantity Q0, by means of a feedback circuit CFB. This reinjection restores the capacitor to its starting charge state.

The switchover also triggers the incrementing of the counter CPT1. At the end of the period of exposure to the X-rays, this counter contains a digital value representing the number of charge increments Q0 successively lost by the capacitor $C_{int}$ then reinjected into the capacitor during this period; this numerical value is representative of the quantity of electrical charges photogenerated by the X illumination.

A detailed exemplary embodiment of such a charge increment counting circuit can be found in U.S. Pat. No. 5,461,425.

FIG. 3 represents the principle of the invention, in a first embodiment. Identical elements in FIG. 2 et seq. are denoted by the same references.

In this first embodiment, the aim is to determine the appearance of an X illumination so as to enable the counting by the counter CPT1 only after the start of this appearance; the counting which might have occurred before the start of the X illumination is here considered spurious. To disable the counting before the start of the X illumination, a circuit CMC is provided at the output of the comparator COMP1 for measuring the output switchover rate of the comparator, this circuit enabling the counting of the switchovers of the comparator only if the rate is sufficiently fast, but not if it is too slow. In practice, a very slow rate tends to indicate that only the dark current (inevitable) is discharging the integration capacitor $C_{int}$. The appearance of X photons necessarily increases this rate for all the pixels of the useful image (only the pixels that are completely protected, for example by a lead plate, would not see this rate increase).

The rate determination can be absolute or relative: it is possible in practice to determine the time interval between two switchovers, or determine the variation of this time interval over time. In the first case, a determination is made as to whether the time interval between a switchover of the comparator and an immediately preceding switchover falls below a predetermined threshold, and the counting by the counter CPT1 is then enabled. In the second case, a determination is made as to whether the time interval between a switchover and the preceding switchover falls abruptly, which represents the appearance of the X illumination.

In FIG. 3, it is assumed that the circuit CMC measures the time interval in an absolute way and compares it to a low threshold. The measured time interval is $T_n - T_{n-1}$ between the instant $T_n$ of a current switchover of rank n and the instant $T_{n-1}$ of a preceding switchover of rank n-1.

The circuit CMC receives the successive switchover pulses produced by the comparator COMP1. It determines the interval $T_n - T_{n-1}$ and compares it to a threshold using a comparator COMP2, one input of which is at a reference level $V_{th2}$ representing this threshold. The output of the comparator disables, via an AND logic gate, the transmission to the counter CPT1 of the switchover signal from the comparator COMP1, if the time interval is above the threshold (and therefore the reverse if the switchover rate is below a threshold). The counting of the switchover pulses by the counter CPT1 is, on the other hand, enabled by the AND gate if the time interval falls below the threshold (therefore the rate above the threshold). The threshold $V_{th1}$ is set for the rate corresponding to the dark current not to trigger the counting and for the rate increase due to the X illumination to trigger the counting, even for the very dark pixels of the image.

The rate measurement circuit can be analog or digital. The digital time interval measurement can be made by counting clock pulses between two switchovers of the comparator COMP1; the analog measurement can be made by constant current integration in a capacitor between two switchovers, which supplies a voltage proportional to the time interval.

FIG. 4 represents a variant of the embodiment of FIG. 3. In this variant, there are two counters CPT1 and CPT2 and the rate measurement circuit switches the switchover pulses from the comparator COMP1 to one or other of the counters depending on the result of the rate measurement: for low rates, corresponding to a time interval measurement voltage above the threshold $V_{th2}$, the pulses are switched to the counter CPT2; for a higher rate, therefore a time interval below this threshold, the pulses are switched to the counter CPT1. This makes it possible to retain in the counter CPT2 the measurement of the dark current which was lost in the case of FIG. 3.

In the embodiments of FIG. 3 and of FIG. 4, it is essentially assumed that the threshold $V_{th2}$ which enables the counting in the counter CPT1 is a high time interval threshold, the counting being enabled below the threshold and disabled above the threshold, because the high threshold represents a rate that is too slow compared to normal operation. However, a similar circuit can be used to disable the counting in the reverse way when the switchover rate is too fast. Thus, if the time interval falls abruptly, it can be assumed that it is because of an undesirable impact of an X photon directly in the electronic circuit where it generates an abrupt decrease in the charge of the capacitor $C_{int}$. In this case, the detection of the downward overshoot of a low threshold $V_{th3}$ (in time interval measurement mode) will be considered to result from spurious switchovers and the counting will be disabled.

This use of a low threshold $V_{th3}$ can be combined with the use of a high threshold $V_{th2}$ in the circuits of FIGS. 3 and 4, by providing an additional comparator, not represented, at the output of the rate measurement circuit CMC, and a logic circuit for preventing the counting when the additional comparator switches over under the effect of an excessively fast rate.

In another application of the invention, the aim is to examine a body by bi-energy radiology, that is, the aim is to detect roughly at the same moment two images of the same part of the body, one obtained with all of the X-ray stream, the other only with high-energy X-rays. It would, moreover, also be possible to envisage a "multiple-energy" examination with more than two energy levels.

In this type of examination, it is possible, for example, to place in front of an X-ray source a rotating filter, of which one segment (fairly large) is transparent or quasi-transparent to the X-rays and another segment (of copper, tin, etc.) is partially absorbent and allows only the higher-energy photons to pass. Thus, depending on whether or not the absorbent sector is in front of the X source, the detector will receive higher-energy photons or all the photons.

The photon stream on the detector will be higher in the second case than in the first case. There will be more switchovers of the comparator. It is therefore possible to detect, from the switchover rate measurement, whether it is a high-energy image or an "all-energies" image. This measurement is therefore used to switch the incrementing pulses received from the comparator COMP1 to a counter CPT1 or to a counter CPT2. After an exposure period, the content of one of the counters will include only the pulses that correspond to the high-energy photons, without it being necessary to establish a synchronization between the rotation of the filter and the switching to the counters.

The information on the low energies then comes from the difference between the contents of the two counters.

It will be understood that, in this case, it is desirable for the rate measurement circuit to look for an abrupt rate variation and the overshooting of a threshold in this variation (detection of relative variation of rate or of time intervals) rather than the overshooting of a period threshold (absolute time interval detection).

FIG. 5 represents the corresponding circuit. This time, the rate measurement circuit CMC measures the relative variation $(\Delta T)_n$, from one switchover to the next, of the time interval $T_n-T_{n-1}$ between a switchover of rank n−1 occurring at the time $T_{n-1}$ and a switchover of rank n occurring at the time $T_n$.

This can be expressed $(\Delta T)_n = (T_n - T_{n-1}) - T_{n-1} - T_{n-2})$.

If this variation exceeds a threshold $\Delta 0$ in a first direction (positive variation, for example, detected by a threshold comparator COMP3), it is assumed that there has been a change from a filtering position/of absence of filtering where the photon stream is higher to a filtering position/of absence of filtering where only the high-energy electrons illuminate the body being examined. If the variation exceeds this threshold $\Delta 0$ in the other direction, it is assumed that the reverse applies (negative variation detected by a threshold comparator COMP4). The operation of the counters CPT1 and CPT2 is then alternated according to this threshold overshoot detection. Until a new overshoot occurs, the counting is maintained in the counter that was previously selected.

For the measurement of the time intervals, as for the measurement of the differences between successive time intervals, it would be possible to measure the time interval by counting fixed frequency clock ticks, common to all the pixels of the matrix. However, this presupposes bringing a clock signal to the core of each of the pixels, which is not necessarily desirable. It would also be possible to generate a small clock in each of the pixels, assuming that the technological dispersion within the matrix is sufficiently weak for all these clocks to have almost the same frequency. It is also possible to establish a time measurement by integrating a current of fixed value in an integrator, which establishes a voltage ramp of known gradient, enabling a fairly easy relative time interval measurement.

FIG. 6 represents the circuit diagram of an exemplary embodiment of the CMC circuit of FIG. 5, enabling a rate variation measurement via a measurement of differences between successive time intervals separating the switchovers.

The circuit comprises a fixed current $I_O$ source, an integrator consisting of an operational amplifier INT1 looped via a first capacitor $C_O$, a second capacitor C1 for storing a voltage level representing a first current time interval and a third capacitor C2 for storing a second time interval preceding the current interval; the voltage levels in the two capacitors are applied to the terminals of the two threshold comparators COMP3 and COMP4 of FIG. 5.

A switch K2 is used to reset the integrator INT1 by short circuiting the terminals of the capacitor $C_O$. A switch K1 is used to bring the capacitor C1 to the potential of the capacitor $C_O$. A switch $K_O$ is used to bring the capacitor C2 to the potential of the capacitor C1. The switches K1 and K2 are operated in turn with a slight delay relative to the operation of the switch $K_O$ which is closed by a switchover pulse from the comparator COMP1 of FIG. 5.

This circuit, given by way of example, works as follows: on a switchover of rank n−1 of the comparator COMP1 of the preceding figures, a brief control pulse $S_O$ is sent, followed by a brief pulse S1, which is in turn followed by a brief pulse S2. These three pulses do not overlap. Basic delay circuits DL are represented to show the delay of the signals relative to one another. The durations of these pulses and their delays are short compared to the time intervals that are to be measured.

The pulse $S_O$ briefly closes the switch $K_O$. The capacitor C2 is charged to the potential of the capacitor C1 and then the switch $K_O$ opens again. The capacitor C2 has a much lower value than C1 so as not to discharge C1 significantly during this operation, or even a charge copying circuit (voltage follower or similar) charges C2 to a voltage representing the charge present in C1.

Then, the pulse S1 appears which briefly closes the switch K1. The capacitor C1 is charged to the potential of the capacitor $C_O$, then the switch K1 opens again. Here again, a copying circuit can be used to place in C1 a charge representing the charge of $C_O$.

Finally, the pulse S2 appears which resets the charge of the capacitor $C_O$, which triggers a new integration period.

At this stage, the capacitor C1 contains a charge which represents the time interval $(T_{n-1}-T_{n-2})$ between a switchover of rank n−2 and a switchover of rank n−1.

During the following time interval, from $T_{n-1}$ to $T_n$, the capacitor $C_O$ is charged progressively to a voltage value representing this time interval.

When a new pulse $S_O$ appears, indicating the switchover of rank n at $T_n$, the capacitor C2 is charged to the voltage of C1, and therefore to the voltage representing the duration $(T_{n-1}-T_{n-2})$ of the preceding time interval; then, the pulse S1 appears and places in C1 the voltage of $C_O$ representing the new current time interval $(T_n-T_{n-1})$.

The capacitors C1 and C2 are connected to the terminals of the two threshold comparators COMP3 and COMP4 which are used to detect that the difference between the voltages exceeds or does not exceed a predetermined threshold $\Delta 0$. The connection of C1 and C2 is reversed between the comparators COMP3 and COMP4 in order for the comparator COMP3 to detect an overshoot in the positive direction (increase of the time interval above a threshold $+\Delta 0$) and the comparator COMP4 detects an overshoot in the negative direction (reduction of the time interval below a threshold $-\Delta 0$).

The outputs of the comparators are used to control the switching to the counters CPT1 and CPT2 (see FIG. 5). If one of the comparators detects an overshoot, then it orders the activation of a respective counter by deactivating the other. If none of the comparators detects an overshoot, the previously active counter remains active. The detection of an overshoot by both comparators at the same time is not possible. The control logic for switching to one or other of the counters is therefore very simple, based on the outputs of the two comparators.

Figure 7:
FIG. 7 is a spectrometry circuit diagram in which photon counting pulses are switched to one or other of two counters according to the energy contained in a burst of charge packets due to an X or gamma photon impact.

FIG. 7 represents an application of the invention to spectrometric measurement. The detector is used to obtain the spectrometry of impacts of isolated X photons: a pixel receives an X photon and the aim is to determine whether this photon is a high-energy or low-energy photon, to then count, during an exposure period, the number of X photons received in each energy category; on the arrival of a photon on a pixel, the photodetector rapidly produces a quantity of charges which are integrated; these charges are counted by the comparator (COMP1) reading circuit which counts the successive charge increments due to the photon; this produces a burst of rapid counting pulses. The rate analysis circuit detects the presence of this burst by examining whether several pulses arrive within a predetermined time interval; it then determines whether the number of switchovers NR in the burst is above or below a threshold $NR_{min}$; if it is below, the number of switchovers is not taken into account, assuming that it does not truly represent the impact of a photon; if it is above, the number of switchovers during a burst is taken into account to determine, depending on whether it is greater than or less than an intermediate value NR0, the energy category within which the photon falls.

Thus, in this application, the circuit for determining the switchover rate CMC supplies not only an indication of the existence of a burst of rapid switchovers, and an incrementing pulse if a burst is detected, but also a number of pulses NR present in this burst. Depending on whether this number NR is greater than or less than a threshold NR0, it is assumed that the photon which gave rise to the burst has a high or low energy. In one case, a counter CPT1 is incremented by one unit, in the other case, another counter CPT2 is incremented by one unit. The high-energy photons and the low-energy photons are therefore counted separately.

The comparator COMP3 of FIG. 7 is used in this case to compare the number NR to the threshold reference NR0. The comparison is preferably made in analog mode and the numbers NR and NR0 are represented by voltages.

Figure 8:
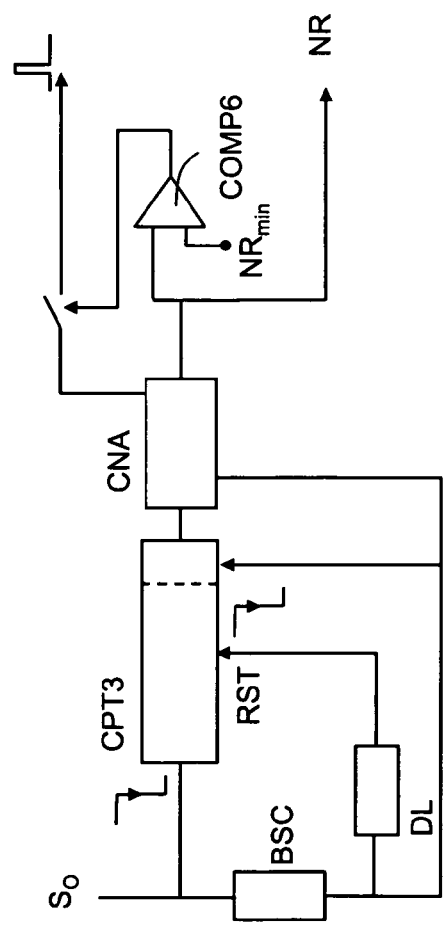
FIG. 8 represents a diagram of a circuit for counting pulses in a burst, which can be used in the circuit of FIG. 7.

FIG. 8 represents an exemplary CMC circuit that can be used in the manner indicated hereinabove to fulfill the functionalities for determining the existence of an X photon impact and counting the pulses generated by this impact. The detection of the impact is, once again, based on the idea that the rate of the switchovers becomes fast whereas it was slow in the absence of impact of a photon. The signal $S_O$ which represents a switchover pulse from the comparator COMP1 (FIG. 7) is applied on the one hand to a counter CPT3 to increment it by one unit, and on the other hand to a delaying circuit which resets via its reset input RST the counter CPT3 if a new pulse does not arrive within a short time. The delaying circuit comprises a retriggerable monostable flip-flop BSC, the function of which is as follows: it establishes a rising edge to a high level on the pulse $S_O$ then maintains this level for a period dT and returns to the low level after dT unless, in the meantime, it has received a new pulse $S_O$. Each time a new pulse arrives during the high level, the level remains high. This monostable flip-flop interrupts the counting of bursts or of isolated pulses immediately the interval between pulses becomes longer than dT. It enables the counting of the pulses of the burst as long as the pulses follow each other at a rate faster than dT.

At the end of the burst, when the flip-flop BSC returns to the low level and just before the resetting of the counter, the content of the counter is retained in memory to be analyzed: it contains the number NR of pulses in the burst. This number can be converted into an analog value NRa in a digital-analog converter DAC, and applied to a threshold comparator COMP6. The threshold of this comparator is chosen to eliminate the very low contents of the counter, which do not truly correspond to a burst representative of a photon impact; this threshold corresponds to a number of pulses $NR_{min}$ in the burst. Only the contents NR of the counter above this threshold $NR_{min}$ enable the sending of an incrementing pulse (representative of the existence of a true burst due to a photon impact) to the counters CPT1 or CPT2 at the end of the burst. The incrementing pulse is transmitted at the end of the burst, before the resetting of the counter.

Finally, the output of the digital-analog converter DAC is applied to the comparator COMP5 of FIG. 7, this output representing the number NR of pulses in the burst, and therefore the energy of the burst, to be compared with a reference NR0.

As a variant of embodiment, the converter DAC and the comparators COMP6 and COMP5 can be eliminated, and the content of the counter CPT3 can be used directly to switch an incrementing pulse to one or other of the counters CPT1 and CPT2. A multiplexer (not represented) controlled by the content of the counter CPT3 is then provided. At the end of the burst, the incrementing pulse is transmitted through this multiplexer either to one counter or to another or even not at all depending on the number contained in the counter (greater than NR0, less than NR0, less than $NR_{min}$). This moreover makes it possible to provide a greater number of counters such as CPT1 and CPT2 to separate the photons into more than two energy categories depending on the content of the counter CPT3. The content of CPT3 is therefore used to address to one of several counters a counting pulse triggered by the end of the burst generated by a photon.

It will be understood that the switchover rate analysis circuit proposed by the present invention is provided at the level of each pixel of the detection matrix, but, in the case of spectrometry, the matrix could be limited to a single pixel if the aim was to detect photons without looking for an image.

It will be readily seen by one of ordinary skill in the art that the present invention fulfils all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A radiation detector comprising:
one or more detection pixels, in which each pixel comprises a detecting element adapted to generate a current in response to impinging radiation, said pixel comprising:
a reading circuit comprising a capacitor for integrating said current, a comparator switching over each time a predetermined charge increment has been received in the capacitor, means for re-injecting into the capacitor, after said switchover, a compensating charge corresponding to said predetermined charge increment, and a counting circuit for counting a number of switchovers of the comparator, said number representing an energy of radiation received by the detection pixels,
wherein the circuit for reading each pixel comprises a circuit for analyzing a rate of the switchovers of the comparator, this analysis circuit acting on the counting circuit to modify its operation according to the result of the rate analysis.

2. The radiation detector as claimed in claim 1, wherein the rate analysis circuit is arranged to determine the time interval $(T_n - T_{n-1})$ existing between successive switchovers and comparing it to a threshold $(V_{th2})$.

3. The radiation detector as claimed in claim 2, wherein the reading circuit comprises means for preventing the counting circuit from being incremented if the rate is below a bottom lower threshold value.

4. The radiation detector as claimed in claim 2, wherein the reading circuit comprises two counters which are used alternately depending on whether the measured rate is above or below a threshold.

5. The radiation detector as claimed in claim 1, wherein the reading circuit comprises means for interrupting the counting if the switchover rate rises abruptly.

6. The radiation detector as claimed in claim 5, comprising means for restoring the counting when the switchover rate falls.

7. The radiation detector as claimed in claim 1, wherein the counting switchover rate analysis circuit comprises means for detecting an abrupt rise or fall in the rate and means for controlling the incrementing of a first counter or of a second counter according to this detection.

8. The radiation detector as claimed in claim 1, wherein the rate analysis circuit comprises a means of detecting a rapid burst of switchovers, a means for counting the number of switchovers in the burst, and a means for incrementing a first or a second counter depending on whether the number of switchovers in the burst is greater than or less than a threshold.

9. The radiation detector as claimed in claim 1, wherein the rate analysis circuit comprises a means of detecting a rapid burst of switchovers, a means for counting the number of switchovers in the burst, and a means for switching a counting pulse at the end of the burst to one of several counters according to the number of switchovers in the burst.

10. The radiation detector as claimed in claim 1, wherein the rate analysis circuit comprises a circuit for integrating a fixed current $(I_O)$ in a capacitor $(C_O)$ for a time interval between two successive switchovers of the comparator.

11. The radiation detector as claimed in claim 1, which comprises a means for determining a variation, during a series of switchovers, in the time interval between a current switchover and a preceding switchover.

12. The radiation detector as claimed in claim 2, wherein the reading circuit comprises means for interrupting the counting if the switchover rate rises abruptly.

13. The radiation detector as claimed in claim 3, wherein the reading circuit comprises means for interrupting the counting if the switchover rate rises abruptly.

14. The radiation detector as claimed in claim 2, wherein the counting switchover rate analysis circuit comprises means for detecting an abrupt rise or fall in the rate and means for controlling the incrementing of a first counter or of a second counter according to this detection.

15. The radiation detector as claimed in claim 3, wherein the counting switchover rate analysis circuit comprises means for detecting an abrupt rise or fall in the rate and means for controlling the incrementing of a first counter or of a second counter according to this detection.

16. The radiation detector as claimed in claim 2, wherein the rate analysis circuit comprises a means of detecting a rapid burst of switchovers, a means for counting the number of switchovers in the burst, and a means for incrementing a first or a second counter depending on whether the number of switchovers in the burst is greater than or less than a threshold.

17. The radiation detector as claimed in claim 3, wherein the rate analysis circuit comprises a means of detecting a rapid burst of switchovers, a means for counting the number of switchovers in the burst, and a means for incrementing a first or a second counter depending on whether the number of switchovers in the burst is greater than or less than a threshold.

18. The radiation detector as claimed in claim 2, wherein the rate analysis circuit comprises a means of detecting a rapid burst of switchovers, a means for counting the number of switchovers in the burst, and a means for switching a counting pulse at the end of the burst to one of several counters according to the number of switchovers in the burst.

19. The radiation detector as claimed in claim 3, wherein the rate analysis circuit comprises a means of detecting a rapid burst of switchovers, a means for counting the number of switchovers in the burst, and a means for switching a counting pulse at the end of the burst to one of several counters according to the number of switchovers in the burst.

20. The radiation detector as claimed in claim 2, wherein the rate analysis circuit comprises a circuit for integrating a fixed current $(I_O)$ in a capacitor $(C_O)$ for a time interval between two successive switchovers of the comparator.

* * * * *